US012443078B2

(12) United States Patent
Yang et al.

(10) Patent No.: US 12,443,078 B2
(45) Date of Patent: Oct. 14, 2025

(54) DISPLAY PANEL AND DISPLAY APPARATUS

(71) Applicants: Hefei BOE Optoelectronics Technology Co., Ltd., Anhui (CN); BOE Technology Group Co., Ltd., Beijing (CN)

(72) Inventors: Jie Yang, Beijing (CN); Yuansheng Zang, Beijing (CN); Chen Xu, Beijing (CN); Lingxiao Hu, Beijing (CN); Hui Guo, Beijing (CN)

(73) Assignees: Hefei BOE Optoelectronics Technology Co., Ltd., Anhui (CN); Beijing BOE Technology Development Co., Ltd., Beijing (CN)

( * ) Notice: Subject to any disclaimer, the term of this patent is extended or adjusted under 35 U.S.C. 154(b) by 0 days.

(21) Appl. No.: 18/290,791

(22) PCT Filed: Nov. 30, 2022

(86) PCT No.: PCT/CN2022/135698
§ 371 (c)(1),
(2) Date: Jan. 21, 2024

(87) PCT Pub. No.: WO2024/113278
PCT Pub. Date: Jun. 6, 2024

(65) Prior Publication Data
US 2025/0093714 A1 Mar. 20, 2025

(51) Int. Cl.
*G02F 1/1362* (2006.01)
(52) U.S. Cl.
CPC .. *G02F 1/136222* (2021.01); *G02F 1/136209* (2013.01); *G02F 1/13629* (2021.01)

(58) Field of Classification Search
CPC ......... G02F 1/136222; G02F 1/136209; G02F 1/13629
See application file for complete search history.

(56) References Cited

U.S. PATENT DOCUMENTS

2021/0034182 A1* 2/2021 Zheng ................. G02F 1/13338
2021/0233977 A1   7/2021 Yang et al.
(Continued)

FOREIGN PATENT DOCUMENTS

CN    106526943 A    3/2017
CN    107728365 A    2/2018
(Continued)

OTHER PUBLICATIONS

PCT/CN2022/135698 international search report dated Aug. 30, 2023.
(Continued)

*Primary Examiner* — Donald L Raleigh
(74) *Attorney, Agent, or Firm* — IPro, PLLC

(57) ABSTRACT

The present disclosure relates to a display panel and a display apparatus. The display panel includes an array substrate, a color filter substrate, a driving chip, and a backlight structure; where the driving chip is electrically connected to the array substrate and is configured to control a voltage signal on the array substrate, the driving chip is disposed at an inner side of the array substrate, and the color filter substrate is located between the array substrate and the backlight structure. In the above structure, the array substrate may be covered on the outer side of the color filter substrate and the driving chip, thereby achieving the protection of the structure at an inner side of the array substrate.

19 Claims, 5 Drawing Sheets

(56) References Cited

U.S. PATENT DOCUMENTS

2021/0356831 A1* 11/2021 Liu ................. G02F 1/1339
2022/0082882 A1* 3/2022 Wang ............... G02F 1/133528

FOREIGN PATENT DOCUMENTS

| | | | |
|---|---|---|---|
| CN | 109100892 | A | 12/2018 |
| CN | 109557726 | A | 4/2019 |
| CN | 109817835 | A | 5/2019 |
| CN | 110488522 | A | 11/2019 |
| CN | 110610965 | A | 12/2019 |
| CN | 111965881 | A | 11/2020 |
| CN | 215181289 | U | 12/2021 |
| CN | 114035357 | A | 2/2022 |
| CN | 114730108 | A | 7/2022 |
| WO | 2022052816 | A1 | 3/2022 |

OTHER PUBLICATIONS

PCT/CN2022/135698 Written Opinion (Revised version) dated Aug. 31, 2023.
CN 202280004812.6 first office action dated Apr. 10, 2025.

\* cited by examiner

DISPLAY PANEL AND DISPLAY APPARATUS

The present disclosure is a U.S. national phase of PCT Application No. PCT/CN2022/135698 filed on Nov. 30, 2022 and entitled "DISPLAY PANEL AND DISPLAY APPARATUS," the disclosure of which is incorporated herein by reference in its entirety.

TECHNICAL FIELD

The present disclosure pertains to the field of display technologies and in particular relates to a display panel and a display apparatus.

BACKGROUND

Along with continuous development of display panel technologies, requirements of users for integration effect of the display panels are dramatically increasing. In a Liquid Crystal Display (abbreviated as LCD), in order to ensure a flatness of a surface, a cover glass (abbreviated as CG) is attached to an outermost side, of the LCD, facing the users. However, the use of the CG not only leads to increased costs, but also causes a certain loss of yield in the attachment process: in addition, the use of the CG hinders lightweight and thin design of products.

SUMMARY

The object of the present disclosure is to provide a display panel and a display apparatus, which may, on the premise of controlling costs, realize lightweight and thin design of the display apparatus while increasing the product yield.

According to a first aspect of embodiments of the present disclosure, a display panel is provided. The display panel includes: an array substrate, a color filter substrate, a driving chip, and a backlight structure;
  the driving chip is electrically connected to the array substrate and is configured to control a voltage signal on the array substrate, the driving chip is disposed at an inner side of the array substrate, and the color filter substrate is located between the array substrate and the backlight structure.

Furthermore, the display panel is configured to be located above a camera module, the display panel includes a functional region, and the camera module is located under the functional region; and
  the backlight structure is away from the functional region.

Furthermore, the display panel is configured to be located above a camera module, the display panel includes a functional region, and the camera module is located under the functional region; and
  both the array substrate and the color filter substrate cover the functional region.

Furthermore, the display panel includes a first light-shielding layer and a second light-shielding layer: the first light-shielding layer is formed at an outer side of the color filter substrate, and a first primary through hole is opened in the first light-shielding layer: the second light-shielding layer is formed at an outer side of the array substrate, and a second primary through hole is opened in the second light-shielding layer; and
  both the first primary through hole and the second primary through hole are in the functional region and face the camera module: along a thickness direction, a projection of the second primary through hole covers a projection of the first primary through hole.

Furthermore, the first primary through hole and the second primary through hole are concentric.

Furthermore, a minimum distance from an outer contour of the first primary through hole to an outer contour of the second primary through hole is taken as a first distance: along the thickness direction, a minimum distance from an end surface, of the first light-shielding layer, facing the backlight structure to an end surface, of the second light-shielding layer, facing the backlight structure is taken as a second distance; and
  the first distance is less than the second distance.

Furthermore, a penetrating second auxiliary through hole is opened in the second light-shielding layer; and
  the first light-shielding layer includes a shielding portion and a light-filtering portion, the shielding portion is configured to block light from passing through, and the first primary through hole is opened in the shielding portion: the light-filtering portion is configured to allow light of a specific waveband to pass through, and at least part of the light-filtering portion is exposed through the second auxiliary through hole.

Furthermore, the display panel is configured to be located above a camera module, the display panel includes a functional region, and the camera module is located under the functional region; and
  the array substrate covers the functional region and the color filter substrate is away from the functional region.

Furthermore, the display panel includes a second light-shielding layer and a third light-shielding layer:
  the second light-shielding layer is formed at an outer side of the array substrate and a penetrating functional through hole is opened in a part, of the second light-shielding layer, located in the functional region; and
  the third light-shielding layer is formed at the inner side of the array substrate.

Furthermore, at least part of the third light-shielding layer is located in the functional region and is configured to allow light of a specific waveband to pass through, and at least a partial structure of the third light-shielding layer is exposed through the functional through hole.

Furthermore, a second primary through hole is opened in the second light-shielding layer, and a third primary through hole is opened in the third light-shielding layer; and
  both the second primary through hole and the third primary through hole are in the functional region and face the camera module: along a thickness direction, a projection of the second primary through hole covers a projection of the third primary through hole.

Furthermore, the second primary through hole and the third primary through hole are concentric; and/or,
  a minimum distance from an outer contour of the second primary through hole to an outer contour of the third primary through hole is taken as a third distance: along the thickness direction, a minimum distance from an end surface, of the second light-shielding layer, facing the backlight structure to an end surface, of the third light-shielding layer, facing the backlight structure is taken as a fourth distance; and the third distance is less than the fourth distance.

Furthermore, the third light-shielding layer includes a functional light-filtering block configured to allow light of a specific waveband to pass through; and
  along a thickness direction, the functional light-filtering block corresponds in position to the functional through hole, and a projection of the functional light-filtering block along the thickness direction covers a projection of the functional through hole along the thickness direction.

Furthermore, the second light-shielding layer is formed by an ink-jet printing process; and/or, the third light-shielding layer is formed by a screen printing process.

Furthermore, the display panel further includes a support structure and the support structure is between the color filter substrate and the array substrate.

Furthermore, the display panel is configured to be located above a camera module, the display panel includes a functional region, and the camera module is located under the functional region: the support structure is located in the functional region and/or at least a partial structure of the support structure surrounds the functional region.

Furthermore, the support structure includes a plurality of support columns and a plurality of support blocks, and a horizontal cross section area of each of the support blocks is greater than a horizontal cross section area of each of the support columns; and the support block is farther away from a central of the functional region than the support column.

Furthermore, the array substrate includes a first glass substrate and a metal film layer, and the metal film layer includes one-layer or multi-layer metal wiring structure: along a thickness direction, the support columns face a single-layer metal wiring structure and/or the support blocks face the multi-layer metal wiring structure; and/or, along a direction outward from the center of the functional region, a sum of cross section areas of the support columns and the support blocks increases gradually.

Furthermore, a cutting line is disposed on the display panel, and a minimum distance L1 between the support structure and the cutting line is greater than or equal to 50 microns, and less than and equal to 200 microns; and/or, the display panel is configured to be located above the camera module and includes a first light-shielding layer: the first light-shielding layer is formed at an outer side of the color filter substrate, and a first primary through hole facing the camera module is opened in the first light-shielding layer: a minimum distance between the support structure and the first primary through hole is greater than or equal to 30 microns and less than or equal to 200 microns; and/or, the display panel further includes sealant, the sealant is disposed between the color filter substrate and the array substrate, and a minimum distance from the support structure to the sealant is greater than or equal to 50 microns and less than or equal to 200 microns.

Furthermore, an end of the support structure is located at one of the color filter substrate and the array substrate; and when the display panel is not under a squeezing force, other end of the support structure is spaced apart from other one of the color filter substrate and the array substrate; and when the display panel is under the squeezing force, the other end of the support structure is abutted against the other one of the color filter substrate and the array substrate.

According to a second aspect of embodiments of the present disclosure, a display apparatus is provided, including a camera module and the above display panel. The display panel is located above the camera module.

According to the above display panel and display apparatus provided by the present disclosure, by using the structure in which the array substrate is covered on the outer side of the color filter substrate, the array substrate may protect the structure at the inner side of the array substrate. Meanwhile, the array substrate located at an outer side may also improve the flatness of the external surface of the display panel, so as to achieve the integrated design of the display panel. Further, by designing the array substrate at the outer side, the step of attaching a cover glass at the outer side of the display panel may be omitted, thereby simplifying the process steps, increasing the product yield, and reducing the entire thickness of the display apparatus.

It should be understood that the above general descriptions and subsequent detailed descriptions are merely illustrative and explanatory rather than limiting of the present disclosure.

BRIEF DESCRIPTION OF DRAWINGS

To describe the technical solutions in the embodiments of the present disclosure more clearly, drawings required in descriptions of the embodiments of the present disclosure will be briefly introduced below. It is apparent that the drawings described below are merely some embodiments of the present disclosure and other drawings may be obtained by those of ordinary skill in the art based on these drawings in the embodiments of the present disclosure without paying creative efforts.

The drawings herein, which are incorporated in the present description and constitute a part of the present description, illustrate embodiments consistent with the present disclosure and serve to explain the principles of the present disclosure together with the present description.

Figure 1:
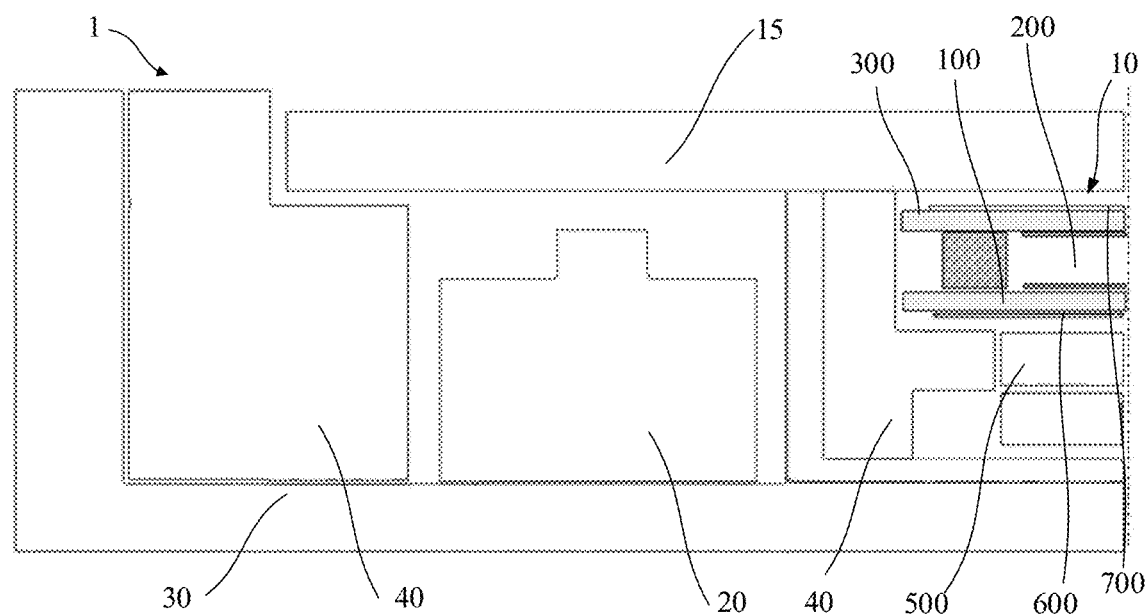
FIG. 1 is a schematic sectional view of a display panel in a design.

Reference signs of drawings are described below:

display apparatus 1, display panel 10, display region 11, non-display region 12, functional region 13, cutting line 14, cover glass 15, camera module 20, back shell 30, middle frame 40), functional module 50, 51. infrared camera module, 52. infrared light-emitting module, 53. light-sensing module, array substrate 100, first glass substrate 110, insulation film layer 120, first insulation layer 121, second insulation layer 122, metal film layer 130, first metal layer 131, second metal layer 132, light deflection layer 200, sealant 210, color filter substrate 300, planarization layer 310, driving chip 400, backlight structure 500, backlight plate 510, light-filtering component 520, first polarizer 600, second polarizer 700, light-blocking structure 800, first light-shielding layer 810, first primary through hole 811, second light-shielding layer 820, second primary through hole 821, functional through hole 822, third light-shielding layer 830, functional light-filtering block 831, first light-filtering block 8311, second light-filtering block 8312, third light-filtering block 8313, third primary through hole 832, support structure 900, support column 910, and support block 920.

DETAILED DESCRIPTION

The technical solutions of embodiments of the present disclosure will be described clearly and fully below in combination with drawings in the embodiments of the present disclosure. It is apparent that the described embodiments are merely a part of embodiments of the present disclosure rather than all embodiments. All other embodiments achieved by those of ordinary skill in the art based on the embodiments in the present disclosure without paying creative efforts shall fall into the scope of protection of the present disclosure.

The terms used in the embodiments of the present disclosure are for the purpose of describing particular embodiments only, and are not intended to limit the embodiments of the present disclosure. Terms described by "a", "the," and "said" in their singular forms in the embodiments of the present disclosure and the appended claims are also intended to include plurality forms, unless clearly indicated otherwise in the context. It should also be understood that the term "and/or" as used herein refers to and includes any and all possible combinations of one or more associated listed items.

The present disclosure provides a display panel and a display apparatus. The display apparatus includes a camera module and the display panel that is located above the camera module. The display panel includes an array substrate, a color filter substrate, a driving chip, and a backlight structure. The driving chip is electrically connected to the array substrate and is configured to control a voltage signal on the array substrate, and the color filter substrate is located between the array substrate and the backlight structure. With the above structure, by using the structure in which the array substrate is covered on the outer side of the color filter substrate and the driving chip, the array substrate may protect the structure at the inner side of the array substrate. Meanwhile, the array substrate located at an outer side may also improve the flatness of the external surface of the display panel, so as to achieve the integrated design of the display panel. Further, by designing the array substrate at the outer side, the step of attaching a cover glass at the outer side of the display panel may be omitted, thereby simplifying the process steps, increasing the product yield, and reducing the entire thickness of the display apparatus.

The display panel described in the present disclosure may be a Liquid Crystal Display (LCD) display device, that may be applied to products or components with a display function, such as a laptop computer, a tablet computer, a television, a smart phone, a watch, and the like, to serve as the display panel of the products or components with the display function, such as the laptop computer, the tablet computer, the television, the smart phone, the watch, and the like.

A display panel 10 and a display apparatus 1 provided by the present disclosure will be described in detail below in combination with FIGS. 2 to 8.

Figure 2:
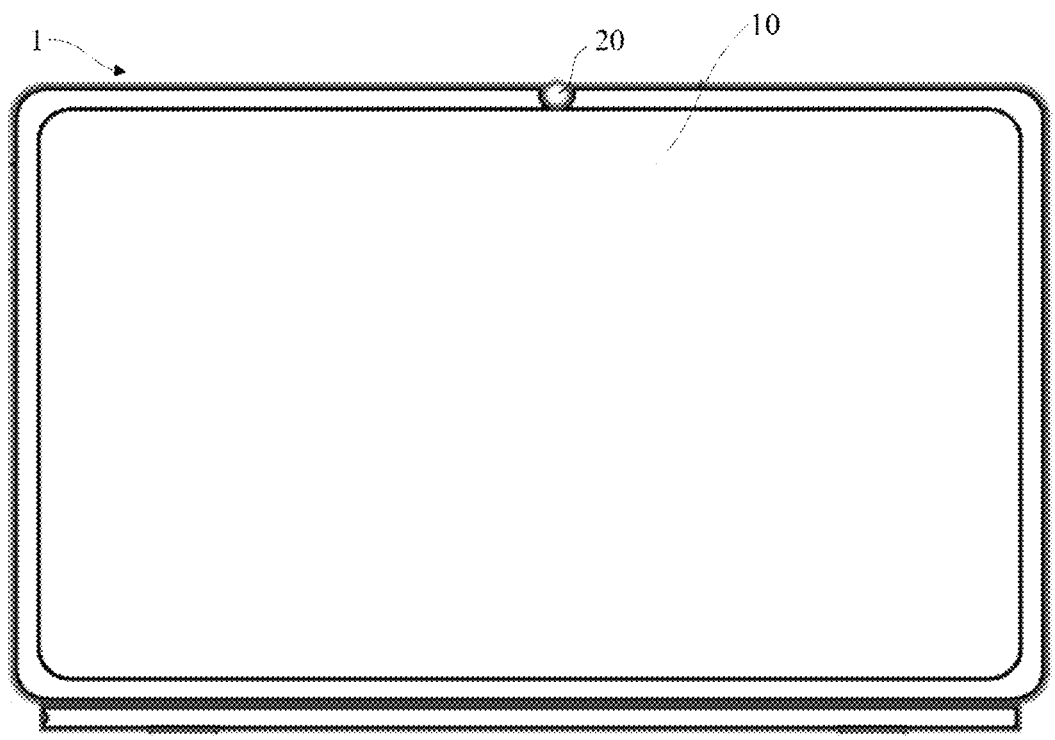
FIG. 2 is a structural schematic diagram illustrating a display apparatus according to an embodiment of the present disclosure.
Figure 3:
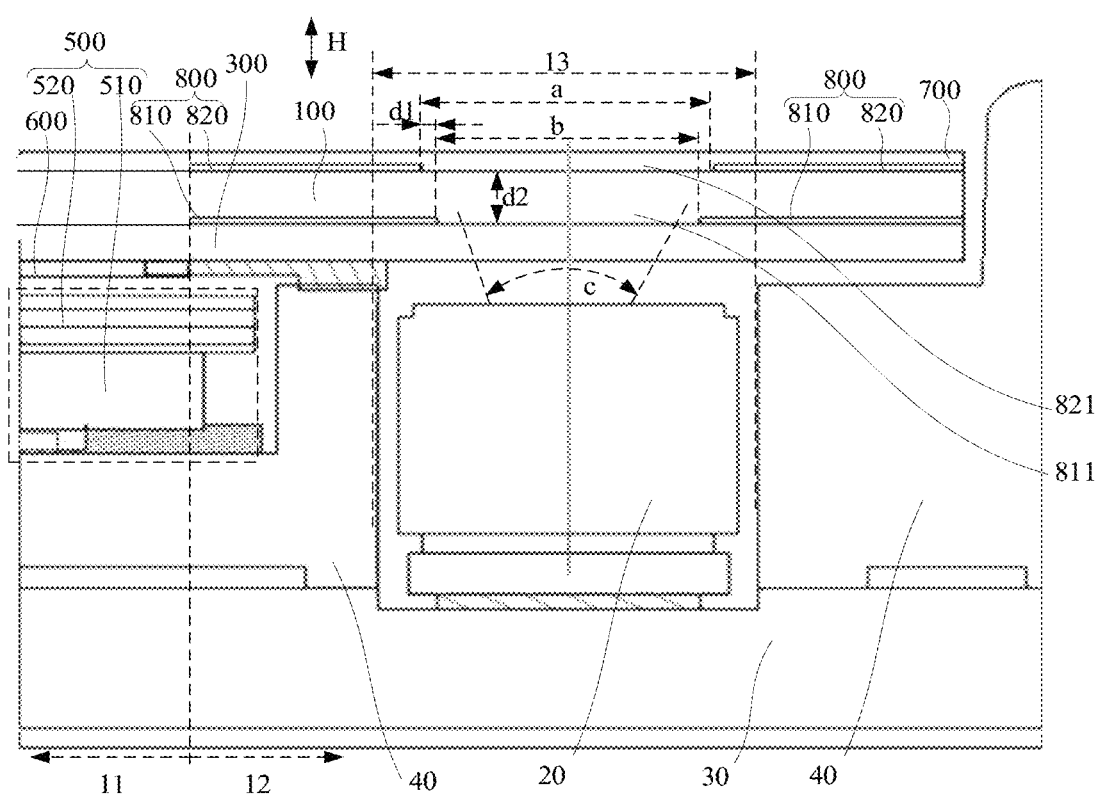
FIG. 3 is a schematic sectional view illustrating a display panel according to an embodiment of the present disclosure.
Figure 4:
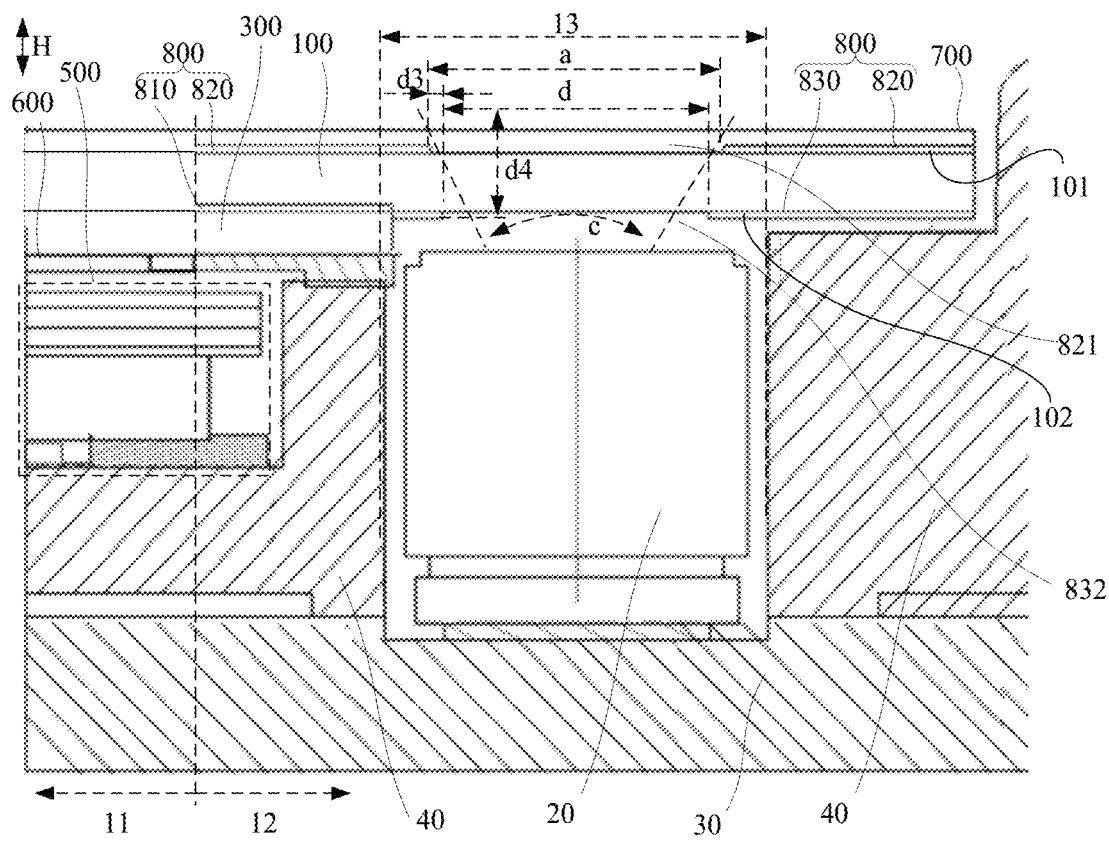
FIG. 4 is a schematic sectional view illustrating a display panel according to another embodiment of the present disclosure.
Figure 5:
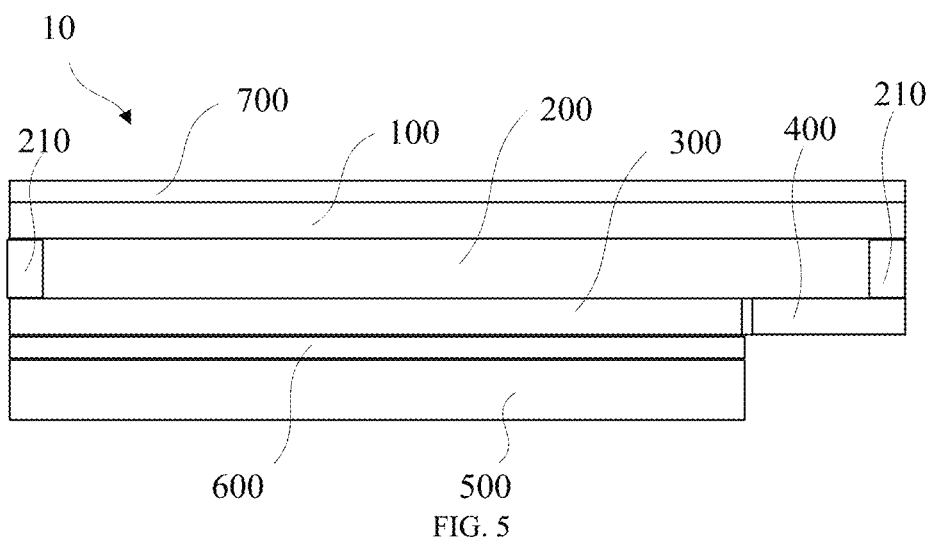
FIG. 5 is another schematic sectional view illustrating a display panel according to an embodiment of the present disclosure.

By referring to FIGS. 2 to 4, the present disclosure provides a display apparatus 1. The display apparatus 1 includes a display panel 10, a camera module 20, a back shell 30, and a middle frame 40. The display panel 10 covers an end, of the camera, away from the back shell 30, to increase a degree of integration at a side, of the display apparatus 1, facing a user. The display panel 10 and the camera module 20 are located inside a receiving hole in the middle frame 40 and are fixedly connected to the back shell 30, where the middle frame 40) renders a support effect. Alternatively, the display panel 10 and the camera module 20 may be fixed to the back shell 30 through the middle frame 40. As shown in FIG. 5, the display panel 10 includes an array substrate 100, a light deflection layer 200, a color filter substrate 300, a driving chip 400, a backlight structure 500, a first polarizer 600, and a second polarizer 700.

The display panel 10 further includes a display region 11 and a non-display region 12. The camera module 20 is disposed under the non-display region 12. The array substrate 100 extends above the camera module 20 and is covered above the camera module 20.

In the display region 11, the light deflection layer 200 is a liquid crystal layer. The backlight structure 500 is disposed at a side, of the display panel 10, away from the user. The display panel 10 further includes a light-emitting structure. In this embodiment, the light-emitting structure is located at a side portion of the display panel 10 and is used to emit white light. The backlight structure 500 includes a backlight plate 510 and a light-filtering component 520. The backlight plate 510) may transmit the white light emitted by the light-emitting structure and improve the distribution uniformity of the white light. The light-filtering component 520 may filter the light transmitted by the backlight plate 510 so as to obtain target light with better uniformity. The light-filtering component 520 may include a film sheet, such as a prismatic lens, a diffuser, or the like. The light transmitted and filtered by the backlight structure 500 firstly passes through the first polarizer 600 to perform preliminary screening on the light. Next, the light passes through the color filter substrate 300 to present different colors of light rays. The liquid crystal layer is sandwiched between the array substrate 100 and the color filter substrate 300. The driving chip 400 is electrically connected to the array substrate 100 and is used to control a voltage signal on the array substrate 100, thereby controlling a voltage applied to the liquid crystal layer. With the change of the voltage on the liquid crystal layer, the light emitted from the color filter substrate 300 and passing through the liquid crystal layer may change a deflection angle so as to present different colors of light rays. Then, the light rays are finally screened by the second polarizer 700 and then emitted toward the user.

In the non-display region 12, no intelligent display is required. At this time, the light deflection layer 200 may be still a liquid crystal layer or merely a vacuum layer. The backlight structure 500 is away from the non-display region 12, and meanwhile, a light-blocking structure 800 located in the non-display region 12 may block the light entering the non-display region 12.

It is to be noted that in order to clearly display the structure and positional relationship of the color filter substrate 300 and the array substrate 100, the structure of the light deflection layer 200 is not shown in FIGS. 3 and 4. In an actual product, the light deflection layer 200 is sandwiched between the color filter substrate 300 and the array substrate 100 (referring to FIG. 5). As shown in FIG. 5, in an actual production process, a sealant 210 is to be disposed between the color filter substrate 300 and the array substrate 100 and liquid crystal are to be filled into a space enclosed by the sealant 210.

By referring to FIGS. 3 to 5, in this embodiment, the driving chip 400 is disposed on a circumference of the color filter substrate 300 and is disposed in the non-display region 12. The array substrate 100 is located at a side, of the color filter substrate 300 and the driving chip 400, away from the backlight structure 500. At this time, there may be a step/difference in level or a gap between the driving chip 400 and the color filter substrate 300, and the array substrate 100 is covered above the driving chip 400 and the color filter substrate 300 and the array substrate 100 protects the structure at the inner side of the array substrate 100. Furthermore, the array substrate 100 located at the outer side may also improve the flatness of an external surface of the display panel 10 so as to achieve the integrated design of the display panel 10. Of course, in other embodiments, the driving chip 400 may not be disposed at the circumference of the color filter substrate 300, but be connected to the array substrate 100 through a circuit board while at least a partial structure of the circuit board is disposed at the circumference of the color filter substrate 300. In the above two embodiments, the driving chip 400 is located at an inner side of the array substrate 100. At this time, there may be a certain difference in level or certain spacing between the circuit board and the color filter substrate 300, and the array substrate 100 covered above the driving chip 400 and the color filter substrate 300 may also protect the structure at the inner side of the array substrate 100. Furthermore, the array substrate 100 located at the outer side may also improve the flatness of the external surface of the display panel 10 so as to achieve the integrated design of the display panel 10. As shown in FIG. 1, in a design, the color filter substrate 300 is usually disposed at a side away from the backlight structure 500, and the driving chip 400 is disposed at a side, of the color filter substrate 300, away from the backlight structure 500. However, in this design, a surface, of the driving chip 400 and the color filter substrate 300, with the difference in level and spacing is exposed at the outer side. Therefore, a cover glass 15 is to be laid thereon to improve the flatness of the external surface of the display panel 10. Compared with the design, the technical solution of the present disclosure may not only improve the flatness of the external surface of the display panel 10, but also omit the step of attaching a cover glass at the outer side of the display panel 10, thereby simplifying the process steps, increasing the product yield, and reducing the entire thickness of the display apparatus 1.

Figure 6:
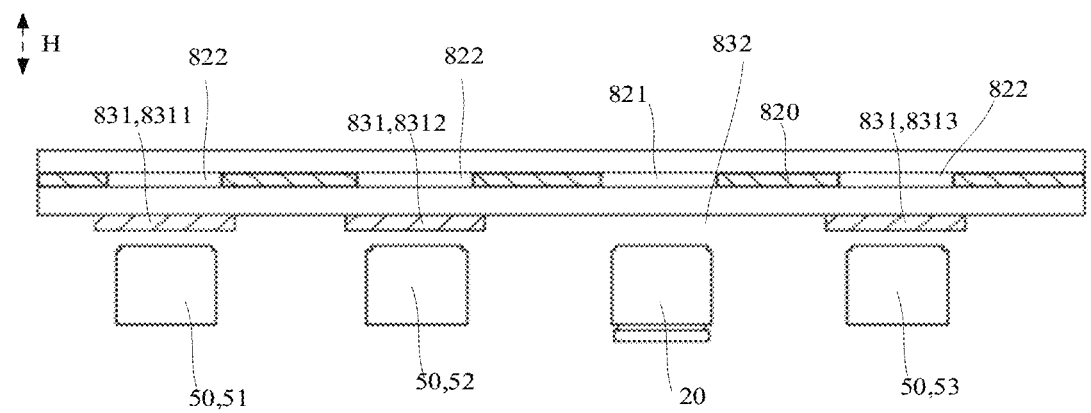
FIG. 6 is another schematic sectional view illustrating a display panel according to another embodiment of the present disclosure.

With reference to FIGS. 3, 4, and 6, a functional region 13 is further disposed in the non-display region 12, and the camera module 20 is disposed under the functional region 13. Furthermore, one or more functional modules 50 may be added under the functional region 13 based on design requirements. In other words, the external light is to enter the functional region 13, to be captured by the camera module 20 and another functional module 50 under the functional region 13; or, light emitted by a specific functional module 50 under the functional region 13 is to be emitted outwardly through the functional region 13. In the present disclosure, the backlight structure 500 is away from the functional region 13, to prevent the white light emitted by the backlight structure 500 from affecting the collection of external light by the camera module 20 and another functional module 50, and meanwhile, prevent the white light emitted by the backlight structure 500 from affecting the light emitted outwardly by the another functional module 50.

The display panel 10 further includes a light-blocking structure 800. The light-blocking structure 800 is disposed in the non-display region 12 and is used to block light in a specific region, to prevent the external light from entering the inside of the display apparatus 1, thus preventing the user from seeing the structure inside the display apparatus 1 through the non-display region 12. Specifically, the light-blocking structure 800 includes a first light-shielding layer 810 and a second light-shielding layer 820. The first light-shielding layer 810 is formed at an outer side of the color filter substrate 300 and the second light-shielding layer 820 is formed at an outer side of the array substrate 100.

In this embodiment, the first light-shielding layer 810 is formed by a photolithography process and is a black matrix layer that has a good light shielding effect. However, in the photolithography process, a mask used is expensive and it is difficult to adjust the structure. The second light-shielding layer 820 is formed by an ink-jet printing process with a material of black ink. Although the light shielding effect of the black ink is inferior to the light shielding effect of the black matrix, adjustment to the shape and position of the second light-shielding layer 820 may be achieved by adjusting a software program flexibly. Furthermore, the black matrix requires a high temperature in a formation process whereas the performance of the array substrate is greatly affected by the temperature. Therefore, if a black matrix layer is formed on the array substrate 100, the formation of the array substrate 100 will be harmed. For this reason, the black matrix layer is formed on the color filter substrate 300 and the black ink layer is formed on the array substrate 100.

Furthermore, a decorative through hole may be formed in the second light-shielding layer 820 and a material capable of reflecting or emitting light is filled in the decorative through hole to allow the user to see the decorative through hole from the outer side. By designing a shape of the decorative through hole, a display effect may be achieved. For example, a brand logo may be displayed.

As shown in FIG. 3, in this embodiment, both the array substrate 100 and the color filter substrate 300 cover the functional region 13. Both the array substrate 100 and the color filter substrate 300 cover the functional region 13 to increase the degree of integration of a side surface, of the display apparatus 1, facing the user. In addition, both the array substrate 100 and the color filter substrate 300 covering the functional region 13 may also protect the camera module 20 and other functional modules 50 under the functional region 13.

Of course, in other embodiments, as shown in FIG. 4, the color filter substrate 300, the first light-shielding layer 810 above the color filter substrate 300, and the first polarizer 600 are all away from the functional region 13. At this time, the array substrate 100 is disposed above the functional region 13 to cover and protect the camera module 20 and other functional modules 50 under the functional region 13. The mounting position of the display panel 10 may be entirely lowered and the entire thickness of the display apparatus 1 may be reduced, so as to help the miniaturization design of the display apparatus 1. At this time, only the second light-shielding layer 820 may be used to adjust a view angle of the camera module 20. The thickness of the color filter substrate 300 is usually between 0.1 mm and 0.5 mm. The color filter substrate 300 is disposed as the structure shown in the figure, that is, the color filter substrate 300 is disposed away from the functional region 13, and the array substrate 100 is entirely lowered, and hence, compared with the structure shown in FIG. 3, a thickness of 0.1 mm to 0.5 mm may be reduced. In this embodiment, to ensure the structural strength and the entire lightweight and thin design, the thickness of the color filter substrate 300 is preferably controlled between 0.2 mm to 0.4 mm.

In the embodiment as shown in FIG. 3, a first primary through hole 811 is opened in the first light-shielding layer 810 and a second primary through hole 821 is opened in the second light-shielding layer 820. Both the first primary through hole 811 and the second primary through hole 821 are in the functional region 13 and face the camera module 20. In the above structure, the light-blocking structure 800 may prevent the user from seeing the structure inside the display apparatus 1 through the non-display region 12; meanwhile, the first primary through hole 811 and the second primary through hole 821 are opened, such that the external light may pass through the first primary through hole 811 and the second primary through hole 821, enter the lower part of the non-display region 12, and be captured by the camera module 20.

Furthermore, along a thickness direction, a projection of the second primary through hole 821 covers a projection of the first primary through hole 811. The above disposal prevents the second light-shielding layer 820 from blocking a lens of the camera module 20, thereby forming a view angle. In this embodiment, the first primary through hole 811 and the second primary through hole 821 are concentric. To ensure a good photographing effect, a distance between an outer contour of the first primary through hole 811 and an outer contour of the second primary through hole 821 is to be controlled within a proper range. When the distance is too large, the user easily sees the first light-shielding layer 810 through the second primary through hole 821 in the second light-shielding layer 820. When the distance is too small, it is not helpful to adjusting the view angle of the camera module 20. Through a large number of experiments, the inventor finds that when a minimum distance from the outer contour of the first primary through hole 811 to the outer contour of the second primary through hole 821 is greater than or equal to 0.05 mm and less than or equal to 0.13 mm, the above problem may be well balanced.

Furthermore, the sizes of the first primary through hole 811 and the second primary through hole 821 both affect the size of the view angle. Through a large number of experiments, the inventor finds that the minimum distance from the outer contour of the first primary through hole 811 to the outer contour of the second primary through hole 821 is taken as a first distance d1, and a minimum distance from an end surface, of the first light-shielding layer 810, facing the backlight structure 500 to an end surface, of the second light-shielding layer 820, facing the backlight structure 500 is taken as a second distance d2, where the first distance d1 is less than the second distance d2. The above disposal may guarantee that the first light-shielding layer 810 and the second light-shielding layer 820 maintain consistency in the range screening of the light entering the camera module 20. Furthermore, the above disposal may allow the external light to enter the camera module 20 through the view angle to the maximum degree. In the embodiment corresponding to FIG. 3, the second distance d2 is the thickness of the array substrate 100. Further, in this embodiment, shapes of the first primary through hole 811 and the second primary through hole 821 both are circular, and the first distance d1 is a difference between a radius of the first primary through hole 811 and a radius of the second primary through hole 821. In this embodiment, a diameter of the first primary through hole 811 is taken as b and a diameter of the second primary through hole 821 is taken as a. When the lens of the camera module 20 is reduced, the view angle c required by the camera module 20 is also reduced. By adjusting the values of a and b, the view angle c of the camera module 20 can be adjusted, while the user can be prevented from seeing too much structure, inside the display apparatus 1 and under the functional region 13, through the first primary through hole 811 and the second primary through hole 821. In this embodiment, a difference between a and b is 0.2 mm and half of the difference between a and b is less than the thickness of the array substrate 100.

It can be known from the above analysis that to ensure a good photographing effect, the absolute value of the difference between a and b should be greater than 1.0 mm and less than 3.0 mm. If the absolute value of the difference between a and b is too large, the user easily sees the first light-shielding layer 810 through the second primary through hole 821 in the second light-shielding layer 820. Although the first light-shielding layer 810 is made of a light-shielding material, there is still a difference of brightness and/or gray level. In addition, if the absolute value of the difference between a and b is too small, it is not helpful to adjusting the view angle of the camera module 20. In this embodiment, the absolute value of the difference between a and b is greater than 1.5 mm and less than 2.5 mm.

Figure 7:
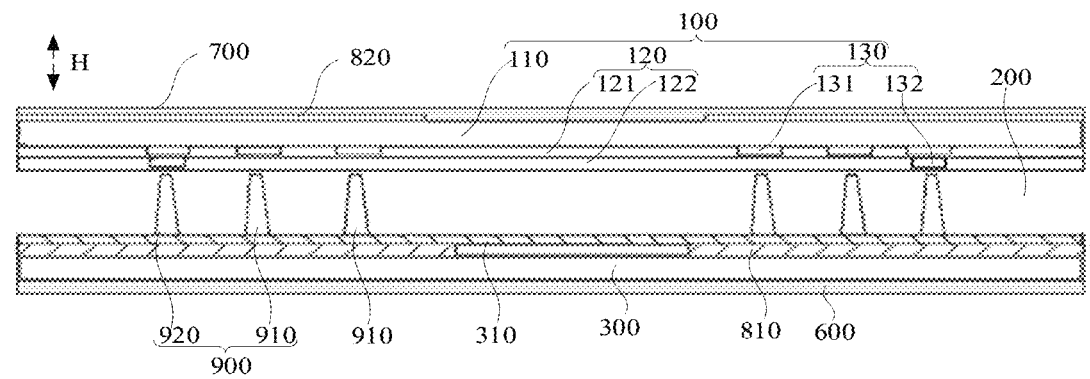
FIG. 7 is another schematic sectional view illustrating a display panel according to an embodiment of the present disclosure.
Figure 8:
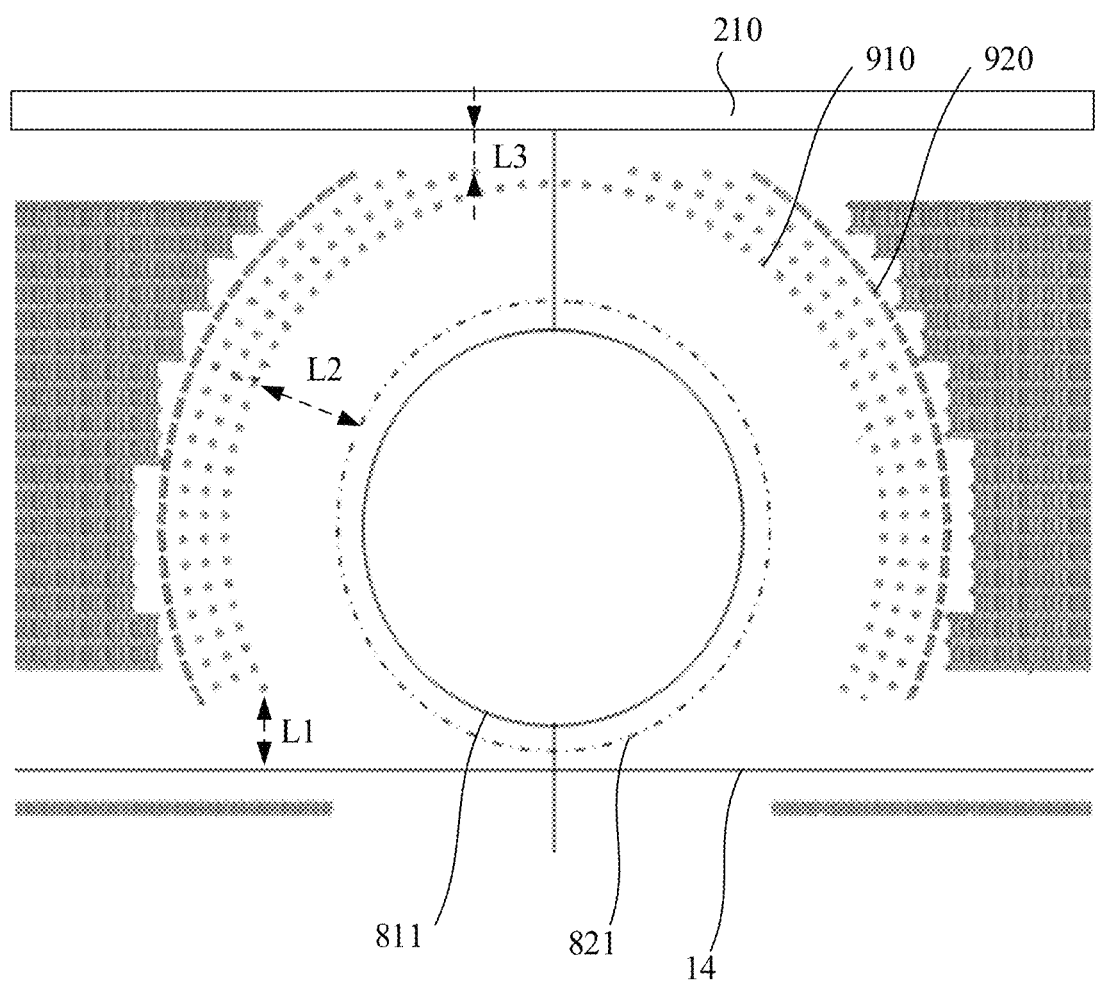
FIG. 8 is another structural schematic diagram illustrating a display panel according to an embodiment of the present disclosure.

As shown in FIGS. 7 and 8, the display panel 10 further includes a support structure 900.

The support structure 900 is disposed in the non-display region 12 and the support structure 900 is disposed between the color filter substrate 300 and the array substrate 100 to achieve a support effect. When the display panel 10 is squeezed, two ends of the support structure 900 are used to be abutted against the color filter substrate 300 and the array substrate 100, respectively. The backlight structure 500 is away from the non-display region 12, thereby leading to the lower structural strength of the non-display region 12. The support structure 900 is added between the color filter substrate 300 and the array substrate 100 to achieve a support and reinforcing effect on the entire structure.

Specifically, the support structure 900 is located in the functional region 13 and meanwhile, at least part of the support structure 900 surrounds the functional region 13. It can be known from the above analysis that to ensure the external light may successfully enter the camera module 20 through the light-blocking structure 800, the first primary through hole 811 is opened in the first light-shielding layer 810, which lowers the strength of the entire structure. When the user squeezes the display panel 10 at the functional region 13, the display panel 10 easily displaces inwardly or left-right. Therefore, the disposal of the support structure 900 in the functional region 13 may effectively reduce excessive displacement of the display panel 10.

Furthermore, the support structure 900 includes one or more support columns 910 and one or more support blocks 920. A horizontal cross section area of the support block 920 is greater than a horizontal cross section area of the support column 910. The support blocks 920 are farther away from a central of the functional region 13 than the support columns 910. In this embodiment, support columns 910 with smaller cross section area are disposed surrounding the circumference of the first primary through hole 811 and the second primary through hole 821, and then support blocks 920 with larger cross section area are disposed surrounding the circumference of the support columns 910. In the actual test process, the inventor finds that the display panel 10 at the position where the first primary through hole 811 and the second primary through hole 821 are opened in the functional region 13 has a low strength, and thus, easily appears a large deformation under the action of an external force. If a large area of support structures 900 are directly added near the functional region 13, the structural strength at the edge position of the functional region 13 tends to change abruptly, such that a large difference in level/step may appear at the edge position of the functional region 13 when the display panel 10 is under a squeezing force, which is not helpful to the stability of the entire structure. In the above structure of the present disclosure, by limiting the positions of the support columns 910 and the support blocks 920, the area occupied by the support columns 910 and/or support blocks 920 gradually increases along a direction outward from the center of the functional region 13 and the sum of the cross section areas, per unit area, of the support columns 910 and the support blocks 920 increases gradually along the direction outward from the center of the functional region 13. With the above disposal, the abrupt change of the structural strength of the display panel 10 near the functional region 13 is avoided, so as to ensure the stability of the entire structure.

Furthermore, as shown in FIG. 7, the array substrate 100 includes a first glass substrate 110, an insulation film layer 120, and a metal film layer 130. The insulation film layer 120 and the metal film layer 130 are disposed at a side, of the first glass substrate 110, facing the color filter substrate 300, while the insulation film layer 120 is covered at the circumference of the metal film layer 130. In this embodiment, the insulation film layer 120 includes a first insulation layer 121 and a second insulation layer 122. The metal film layer 130 includes two-layer metal wiring structure, and the two layers are a first metal layer 131 and a second metal layer 132 respectively. The first insulation layer 121 is wrapped at the circumference of the first metal layer 131, and the second insulation layer 122 is wrapped at the circumference of the second metal layer 132. The second metal layer 132 is further disposed at a side, of a part of the first metal layer 131, away from the first glass substrate 110 to form a multi-layer metal wiring structure. Only the second insulation layer 122 and at least part of the first insulation layer 121 are disposed at a side, of a part of the first metal layer 131, away from the first glass substrate 110 to form a single-layer metal wiring structure.

Along the thickness direction H, a projection of at least part of the support structure 900 on the array substrate 100 is overlapped with a projection of the metal wiring structure on the array substrate 100, namely, at least part of the support columns 910 and the support blocks 920 face the metal wiring structure. With the above disposal, when the display panel 10 is under a squeezing force, the functional region 13 appears a large deformation, and especially the region where the first primary through hole 811 and the second primary through hole 821 are opened appears a large deformation. The deformation amount of the region away from the first primary through hole 811 and the second primary through hole 821 is small. Each region also appears a horizontal displacement while appearing inward recess deformation. At least part of the support columns 910 and the support blocks 920 face the metal wiring structure, such that when the display panel 10 is squeezed to appear the deformation, at least part of the support blocks 920 and the support columns 910 may be abutted against the metal wiring structure. The strength of the metal wiring structure is greater than the strength of the first insulation layer 121 and the second insulation layer 122. The manner of abutting against the metal wiring not only may avoid the problem of excessive recess amount of a part of region of the display panel 10, but also may reduce or avoid a partial lateral displacement of the display panel 10 by increasing a lateral frictional force with the abutting.

Furthermore, the support columns 910 and the support blocks 920 all face the metal wiring structure. In the above structure, when the display panel 10 is under a squeezing force, the functional region 13 appears a large deformation, and especially the region where the first primary through hole 811 and the second primary through hole 821 are opened appears a large deformation. The deformation amount of the region away from the first primary through hole 811 and the second primary through hole 821 is small. Each region also appears a horizontal displacement while appearing inward recess deformation. The support blocks 920 and the support columns 910 face the metal wiring structure, such that when the display panel 10 is squeezed to appear the deformation, ends, of the support blocks 920 and the support columns 910, facing the metal wiring structure may be abutted against the metal wiring structure. The strength of the metal wiring structure is greater than the strength of the first insulation layer 121 and the second insulation layer 122. The manner of abutting against the metal wiring not only may avoid the problem of excessive recess amount of a part of region of the display panel 10, but also may reduce or avoid a partial lateral displacement of the display panel 10 by increasing a lateral frictional force with the abutting.

Furthermore, the support columns 910 face the single-layer metal wiring structure and the support blocks 920 face the multi-layer metal wiring structure. In the above structure, when the display panel 10 is deformed, the support blocks 920 may be abutted against the multi-layer metal wiring structure, i.e. against the second metal layer 132, so as to achieve a small deformation amount of the region, of the display panel 10, away from the first primary through hole 811 and the second primary through hole 821. The support columns 910 may be abutted against the single-layer metal wiring structure, i.e. against the first metal layer 131, so as to achieve a large deformation amount of the region, of the display panel 10, close to the first primary through hole 811 and the second primary through hole 821. Therefore, the abrupt change of the deformation amount of the display panel 10 near the functional region 13 is avoided, thereby ensuring the stability of the entire structure.

In other embodiments, no metal wiring structure may be disposed at the outer side of part of the support columns 910 and of part of the support blocks 920. However, it should be guaranteed that, in the functional region 13, the number of the support columns 910 and the support blocks 920 provided with the metal wiring structure at the outer side is greater than the number of the support columns 910 and the support blocks 920 provided with no metal wiring structure at the outer side, to ensure that the entire structure has the good stability. Of course, in some other embodiments, the number of the support columns 910 and the support blocks 920 provided with the metal wiring structure at the outer side may be set based on actual requirements.

As shown in FIG. 7, in this embodiment, an end of the support structure 900 is located above the color filter substrate 300. Specifically, a first light-shielding layer 810 is disposed on the color filter substrate 300, a planarization layer 310 is disposed on the first light-shielding layer 810, and the support structure 900 is formed above the planarization layer 310. When the display panel 10 is not under a squeezing force, an end, of the support structure 900, away from the color filter substrate 300 is spaced apart from the array substrate 100. When the display panel 10 is under a squeezing force, the end, of the support structure 900, away from the color filter substrate 300 is abutted against the metal wiring layer on the array substrate 100.

Of course, in other embodiments, an end of the support structure 900 may be located on the array substrate 100. When the display panel 10 is not under a squeezing force, an end, of the support structure 900, away from the array substrate 100 is spaced apart from the color filter substrate 300. When the display panel 10 is under a squeezing force, the end, of the support structure 900, away from the array substrate 100 is abutted against the color filter substrate 300.

As shown in FIG. 8, in the process of manufacturing the display panel 10, a cutting line 14 is disposed on the display panel, where the cutting line 14 is located at an outer side of the functional region 13. The factory may perform region cutting based on actual requirements of the customers. To avoid the influence of the cutting at the cutting line 14 on the support structure 900, it is to be ensured that a minimum distance L1 between the support structure 900 and the cutting line 14 is greater than or equal to 50 microns. Further, to ensure uniformity of a cell gap between the array substrate 100 and the color filter substrate 300, the distance between the support structure 900 and the cutting line 14 shall not be too large. Preferably, the minimum distance L1 is to be less than or equal to 200 microns, to ensure that there is an effective support structure 900 between the array substrate 100 and the color filter substrate 300) and to ensure the uniformity of the cell gap between both of them.

Furthermore, if the distance between the second primary through hole 821 and the support structure 900 is too small, the second light-shielding layer 820 cannot fully cover the support structure 900, and the light entering the second primary through hole 821 from the outer side will irradiate the support structure 900 and be reflected by the support structure 900, so as to affect the normal operation of the camera module or other functional modules. Therefore, the minimum distance L2 between the second primary through hole 821 and the support structure 900 is to be greater than or equal to 30 microns, to ensure the normal operation of the camera module 20 and other functional modules 50. Further, to ensure the uniformity of the cell gap between the array substrate 100 and the color filter substrate 300, the distance from the support structure 900 to the second primary through hole 821 should not be too large. Preferably, the minimum distance L2 is to be greater than or equal to 200 microns, to ensure that there is an effective support structure 900 between the array substrate 100 and the color filter substrate 300 and to ensure the uniformity of the cell gap between both of them.

Furthermore, if a distance from the sealant 210 to the support structure 900 is too small, the case of coating the sealant 210 to the surface of the support structure 900 will appear in a process of coating the sealant 210, thereby resulting in the problem of the non-uniform thickness of the support structure 900. Therefore, a minimum distance L3 between the sealant 210 and the support structure 900 is controlled to be greater than or equal to 50 microns to prevent the sealant 210 from being coated to the surface of the support structure 900, thus ensuring the uniformity of the entire thickness of the support structure 900 and then ensuring the uniformity of the cell gap between the color filter substrate 300 and the array substrate 100. Meanwhile, to ensure the uniformity of the cell gap between the array substrate 100 and the color filter substrate 300, the distance between the support structure 900 and the sealant 210 should not be too large. Preferably, the minimum distance L3 is to be greater than or equal to 200 microns, to ensure that there is an effective support structure 900 between the array substrate 100 and the color filter substrate 300 and to ensure the uniformity of the cell gap between both of them.

As shown in FIG. 4, in this embodiment, the color filter substrate 300, the first light-shielding layer 810 above the color filter substrate 300, and the first polarizer 600 are all away from the functional region 13. Only the second light-shielding layer 820 is disposed above the functional region 13, and one or more penetrating functional through holes 822 are opened in a part, of the second light-shielding layer 820, located in the functional region 13. The light-blocking structure 800 further includes a third light-shielding layer 830. The third light-shielding layer 830 is formed at a side, of the array substrate 100, close to the backlight structure 500, and at least part of the third light-shielding layer 830 is located in the functional region 13.

At least part of structure of the third light-shielding layer 830 is exposed through the functional through hole 822 and is configured to absorb light of a part of waveband, that is, at least a partial structure of the third light-shielding layer 830 allows light of a specific waveband to be transmitted to the inside of the display apparatus 1 through the third light-shielding layer and into the space under the functional region 13. Or, at least part of structure of the third light-shielding layer 830 allows light of a specific waveband to be emitted towards the outer side of the display apparatus 1 through the third light-shielding layer and into the external world. Specifically, as shown in FIG. 6, not only is the camera module disposed, but also other functional modules 50 are disposed under the functional region 13, for example, an infrared camera module 51, an infrared light-emitting module 52, and a light-sensing module 53. In this embodiment, the third light-shielding layer 830 includes one or more functional light-filtering blocks 831 configured to allow light of a specific waveband to pass through. Along the thickness direction H, the functional light-filtering blocks 831 correspond in position to the functional through holes 822, and a projection of a functional light-filtering block 831 along the thickness direction H covers a projection of a functional through hole 822 along the thickness direction, to filter the light passing through the functional light-filtering block 831 to the maximum degree. In this embodiment, the functional light-filtering blocks 831 at least include a first light-filtering block 8311, a second light-filtering block 8312, and a third light-filtering block 8313. The first light-filtering block 8311 is disposed above the infrared camera module 51 and is used to allow infrared light to pass through, so as to help the infrared camera module 51 to acquire the infrared light, and hence achieve infrared imaging. In this embodiment, the first light-filtering block 8311 is to allow more than 80% of the infrared light to pass through, to ensure that the infrared camera module 51 acquires light normally. The second light-filtering block 8312 is disposed above the infrared light-emitting module 52 and is used to allow the infrared light to pass through, such that the light emitted by the infrared light-emitting module 52 can be diverged outwardly and is used to achieve functions, such as distance detection. In this embodiment, the second light-filtering block 8312 is to allow more than 85% of the infrared light to pass through, to ensure that the infrared light-emitting module 52 can outwardly emit the infrared light satisfying a preset brightness. The third light-filtering block 8313 may filter the other preset light, such that the light-sensing module 53 may collect light of a specific wavelength. In this embodiment, the third light-filtering block 8313 is to allow more than 35% of the light of a specific wavelength to pass through, to ensure the detection accuracy of the light-sensing module 53. Furthermore, as shown in FIG. 4, in this embodiment, a penetrating third primary through hole 832 may be further formed in the third light-shielding layer 830, and the third primary through hole 832 is located in the functional region 13 and faces the camera module 20. The second primary through hole 821 and the third primary through hole 832 are concentric. Further, along the thickness direction, a projection of the second primary through hole 821 covers a projection of the third primary through hole 832. The third primary through hole 832 is to have the same size and effect as the first primary through hole 811. Specifically, a minimum distance from the outer contour of the second primary through hole 821 to an outer contour of the third primary through hole 832 is taken as third distance d3. Along the thickness direction H, a minimum distance from an end surface, of the second light-shielding layer 820, facing the backlight structure 500) to an end surface, of the third light-shielding layer 830, facing the backlight structure 500 is taken as fourth distance d4. The third distance L3 is less than the fourth distance d4.

In the embodiment shown in FIG. 4, the shape of the third primary through hole 832 is circular and the diameter d of the third primary through hole 832 is the same as the diameter b of the first primary through hole.

It is to be noted that due to limitation of the prior art, the ink with certain functionality can only be formed with a screen printing process. In other words, the third light-shielding layer 830 is formed by the screen printing process.

Specifically, the display panel 10 is produced in the following steps.

At step 1000, the array substrate 100 and the color filter substrate 300 are provided and a cell process is completed. The array substrate 100 includes a first end surface 101 and a second end surface 102 opposed to each other along a thickness direction, and the color filter substrate 300 is located above the second end surface 102. In addition, the array substrate 100 has a larger size than the color filter substrate 300. In other words, the color filter substrate 300 can only cover a part of the second end surface 102, and the other part of the second end surface 102 is not provided with the color filter substrate 300 and is used to dispose a corresponding camera module 20.

At step 2000, the array substrate 100 and color filter substrate 300 units with a specific size are obtained by cutting and grinding.

At step 3000, the second light-shielding layer 820 is formed on the second end surface of the array substrate 100 through an ink-jet printing process. The one or more functional through holes 822 and the decorative through hole are reserved in the second light-shielding layer 820.

At step 4000, the third light-shielding layer 830 is formed through a screen printing process on a part of the position, of the second end surface of the array substrate 100, away from the color filter substrate 300. The functional light-filtering blocks 831 of the third light-shielding layer 830 are disposed corresponding to the functional through holes 822.

It is to be noted that by referring to FIG. 3, in the technical solution in which the first light-shielding layer 810 is formed at an outer side of the color filter substrate 300 and the second light-shielding layer 820 is formed at an outer side of the array substrate 100, at least a partial structure of the first light-shielding layer 810 allows light of a specific waveband to pass through. Specifically, in addition to the second primary through hole 821, a penetrating second auxiliary through hole is opened in the second light-shielding layer 820. The first light-shielding layer 810 includes a shielding portion and a light-filtering portion. The shielding portion is configured to block light from passing through, and the first primary through hole is opened in the shielding portion and located at an outer side of the camera module 20. The light-filtering portion is configured to allow light of a specific waveband to pass through, and the effect of the light-filtering portion is same as the third light-shielding layer 830 in the embodiment shown in FIG. 4. At least part of the light-filtering portion is exposed through the second auxiliary through hole. Another corresponding functional module 50 may be disposed under the light-filtering portion. At this time, the shielding portion of the first light-shielding layer may be formed by a photolithography process and may be at least a partial structure of the black matrix layer. The light-filtering portion is formed by the screen printing process. Of course, the first light-shielding layer 810 may also be a film layer allowing light of a specific waveband to pass through. At this time, the first light-shielding layer 810 is entirely formed by the screen printing process. Alternatively, the first light-shielding layer 810 may only block light from passing through. At this time, the first light-shielding layer 810 is formed by the photolithography process and is a black matrix layer.

In the present disclosure, in case of no conflicts, the structure embodiments and the method embodiments may be mutually supplemented.

Detailed descriptions are made on the method and apparatus provided by the embodiments of the present disclosure above. The principles and implementations of the present disclosure have been set forth with specific examples herein and the above descriptions of the embodiments are used only to help understand the method of the present disclosure and its core idea. Furthermore, those skilled in the art may make changes to the specific implementations and application scope based on the idea of the present disclosure. In conclusion, the contents of the present specification shall not be understood as limiting of the present disclosure.

The invention claimed is:

1. A display panel, comprising an array substrate, a color filter substrate, a driving chip, and a backlight structure; wherein,
   the driving chip is electrically connected to the array substrate and is configured to control a voltage signal on the array substrate, the driving chip is disposed at an inner side of the array substrate, and the color filter substrate is located between the array substrate and the backlight structure; wherein the inner side of the array substrate is a side, of the array substrate, facing the backlight structure,
   wherein the display panel is configured to be located above a camera module, the display panel comprises a functional region, and the camera module is located under the functional region; and
   wherein the backlight structure is away from the functional region.

2. The display panel of claim 1, wherein
both the array substrate and the color filter substrate cover the functional region.

3. The display panel of claim 2, wherein,
the display panel comprises a first light-shielding layer and a second light-shielding layer;
wherein the first light-shielding layer is at an outer side of the color filter substrate, and a first primary through hole is in the first light-shielding layer; wherein the second light-shielding layer is at an outer side of the array substrate, and a second primary through hole is in the second light-shielding layer;
wherein both the first primary through hole and the second primary through hole are in the functional region and face the camera module; wherein along a thickness direction, an orthographic projection of the second primary through hole covers an orthographic projection of the first primary through hole.

4. The display panel of claim 3, wherein the first primary through hole and the second primary through hole are concentric.

5. The display panel of claim 3, wherein a minimum distance from an outer contour of the first primary through hole to an outer contour of the second primary through hole is smaller than a minimum distance along the thickness direction from an end surface, of the first light-shielding layer, facing the backlight structure to an end surface, of the second light-shielding layer, facing the backlight structure.

6. The display panel of claim 3, wherein a penetrating second auxiliary through hole is opened in the second light-shielding layer; and
wherein the first light-shielding layer comprises a shielding portion and a light-filtering portion, the shielding portion is configured to block light from passing through, and the first primary through hole is in the shielding portion; wherein the light-filtering portion is configured to allow light of a specific waveband to pass through, and at least part of the light-filtering portion is exposed through the second auxiliary through hole.

7. The display panel of claim 1, wherein
the array substrate covers the functional region and the color filter substrate is away from the functional region.

8. The display panel of claim 7, wherein,
the display panel comprises a second light-shielding layer and a third light-shielding layer;
the second light-shielding layer is at an outer side of the array substrate and a penetrating functional through hole is in a part, of the second light-shielding layer, located in the functional region; and
the third light-shielding layer is at the inner side of the array substrate.

9. The display panel of claim 8, wherein at least part of the third light-shielding layer is located in the functional region and is configured to allow light of a specific waveband to pass through, and at least a partial structure of the third light-shielding layer is exposed through the penetrating functional through hole.

10. The display panel of claim 8, wherein a second primary through hole is in the second light-shielding layer, and a third primary through hole is in the third light-shielding layer; and
both the second primary through hole and the third primary through hole are in the functional region and face the camera module; along a thickness direction, an orthographic projection of the second primary through hole covers an orthographic projection of the third primary through hole.

11. The display panel of claim 10, wherein the second primary through hole and the third primary through hole are concentric; and/or,
wherein a minimum distance from an outer contour of the second primary through hole to an outer contour of the third primary through hole is smaller than a minimum distance along the thickness direction from an end surface, of the second light-shielding layer, facing the backlight structure to an end surface, of the third light-shielding layer, facing the backlight structure.

12. The display panel of claim 8, wherein the third light-shielding layer comprises a functional light-filtering block configured to allow light of a specific waveband to pass through; and
along a thickness direction, the functional light-filtering block corresponds in position to the penetrating functional through hole, and an orthographic projection of the functional light-filtering block along the thickness direction covers an orthographic projection of the penetrating functional through hole along the thickness direction.

13. The display panel of claim 1, wherein the display panel further comprises a support structure and the support structure is between the color filter substrate and the array substrate.

14. The display panel of claim 13, wherein the support structure is located in the functional region and/or at least a partial structure of the support structure surrounds the functional region.

15. The display panel of claim 14, wherein the support structure comprises a plurality of support columns and a plurality of support blocks, and a horizontal cross section area of each of the support blocks is greater than a horizontal cross section area of each of the support columns; and
the support block is farther away from a center of the functional region than the support column.

16. The display panel of claim 15, wherein the array substrate comprises a first glass substrate and a metal film layer, and the metal film layer comprises single-layer or multi-layer metal wiring structure; along a thickness direction, the support columns face a single-layer metal wiring structure and/or the support blocks face the multi-layer metal wiring structure; and/or,
along a direction outward from the center of the functional region, a sum of cross section areas, per unit area, of the support columns and the support blocks increases gradually.

17. The display panel of claim 15, wherein a minimum distance L1 between the support structure and a cutting line on the display panel is greater than or equal to 50 microns, and less than and equal to 200 microns; and/or,
wherein the display panel comprises a first light-shielding layer; the first light-shielding layer is at an outer side of the color filter substrate, and a first primary through hole facing the camera module is in the first light-shielding layer; a minimum distance between the support structure and the first primary through hole is greater than or equal to 30 microns and less than or equal to 200 microns; and/or,
wherein the display panel further comprises a sealant between the color filter substrate and the array substrate, and a minimum distance from the support structure to the sealant is greater than or equal to 50 microns and less than or equal to 200 microns.

18. The display panel of claim 13, wherein an end of the support structure is located at one of the color filter substrate and the array substrate; and
when the display panel is not under a squeezing force, other end of the support structure is spaced apart from other one of the color filter substrate and the array substrate; and when the display panel is under the squeezing force, the other end of the support structure is abutted against the other one of the color filter substrate and the array substrate.

19. A display apparatus, comprising a camera module and a display panel, wherein the display panel is located above the camera module;
the display panel comprises an array substrate, a color filter substrate, a driving chip, and a backlight structure; wherein,
the driving chip is electrically connected to the array substrate and is used to control a voltage signal on the array substrate, the driving chip is disposed at an inner side of the array substrate, and the color filter substrate is located between the array substrate and the backlight structure.

* * * * *